Figure 6:
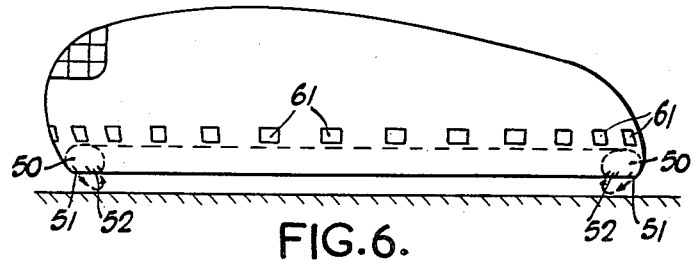

Jan. 14, 1964   C. S. COCKERELL ETAL   3,117,646
GROUND EFFECT VEHICLE HAVING CURTAIN
FORMING FLUID RECOVERY MEANS
Filed April 17, 1961   2 Sheets-Sheet 1
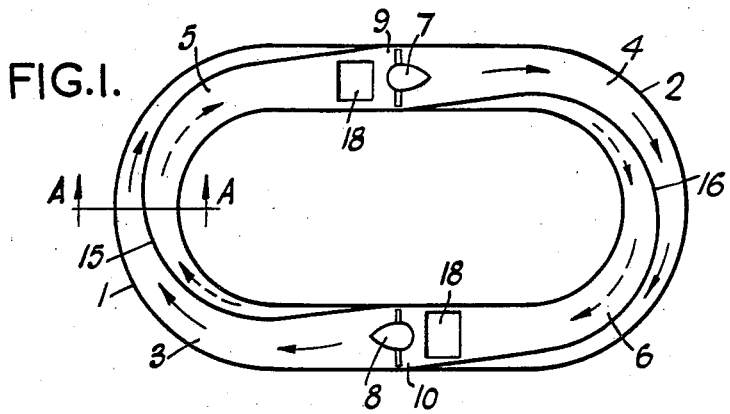
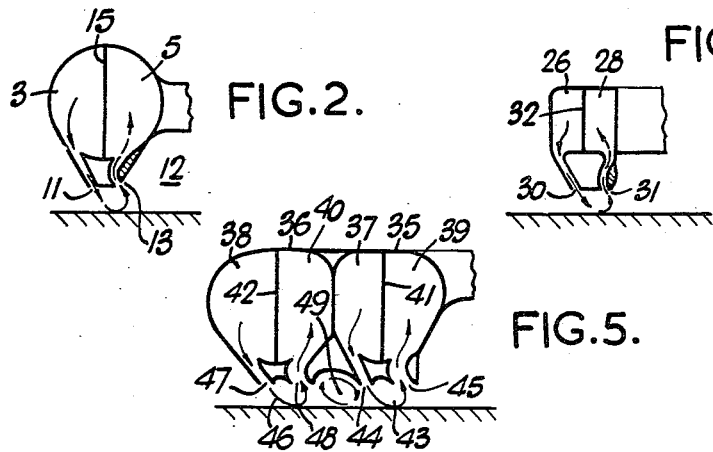
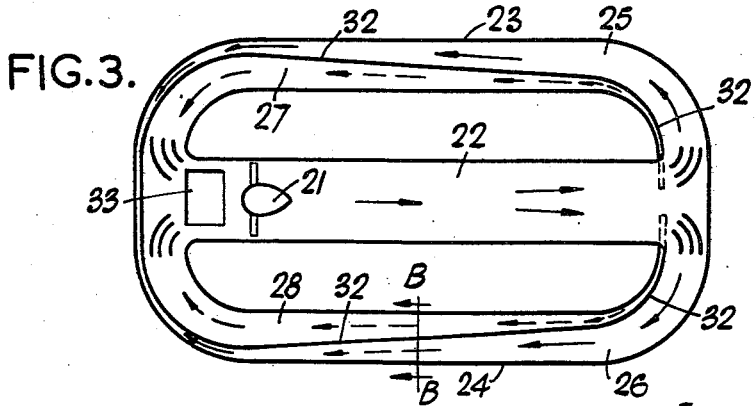
Inventors
C.S. COCKERELL
D.J. HARDY
By Cameron, Kerkam & Sutton
Attorneys Jan. 14, 1964 C. S. COCKERELL ETAL 3,117,646
GROUND EFFECT VEHICLE HAVING CURTAIN
FORMING FLUID RECOVERY MEANS
Filed April 17, 1961 2 Sheets-Sheet 2

Inventors
C.S. COCKERELL
D.J. HARDY
By Cameron, Kerkam + Sutton
Attorneys

United States Patent Office 3,117,646
Patented Jan. 14, 1964

3,117,646
GROUND EFFECT VEHICLE HAVING CURTAIN FORMING FLUID RECOVERY MEANS
Christopher Sydney Cockerell, Lymington, and Derek James Hardy, Isle of Wight, England, assignors to Hovercraft Development Limited, London, England, a British company
Filed Apr. 17, 1961, Ser. No. 103,318
Claims priority, application Great Britain Apr. 20, 1960
10 Claims. (Cl. 180—7)

This invention relates to vehicles of the type which, when in operation, are at least partly supported above a surface by a cushion of pressurised gas, such as air, the cushion being contained beneath the vehicle for at least part of its periphery by one or more curtains of fluid issuing from a port or ports formed in the bottom of the vehicle and positioned adjacent to the outer edge thereof. It has been proposed in vehicles of this type that at least some of the fluid forming the curtain or curtains should be recovered through a further port or ports in the bottom of the vehicle and re-circulated, to at least assist in forming the original curtain, or to form a further curtain.

It is generally necessary to re-energise the recovered fluid before it is re-used, the fluid being passed for example through a compressor or compressors. The fluid is fed from the compressor to the curtain forming port or ports via ducts, the quantity of fluid in the duct decreasing along the duct as air issues from the port. Conversely the amount of fluid in the duct conveying the air from the recovery port increases as the duct approaches the compressor. By suitably arranging and forming the ducts, savings in space and weight together with an increased fluid flow efficiency can be obtained.

According to the invention there is provided a vehicle for travelling over a surface which, in operation, is at least partly supported above that surface by a cushion of pressurised gas formed beneath the vehicle, the cushion being contained for at least part of its periphery by a curtain of fluid issuing from a supply port or supply ports formed in the bottom of the vehicle and adjacent to the periphery thereof, at least part of the fluid forming the curtain being recovered through a recovery port or recovery ports, formed in the bottom of the vehicle parallel to and inboard of the supply port or ports, and having a duct system for supplying fluid to the supply port or ports and recovering fluid from the recovery port or ports comprising at least one supply duct and at least one cooperating recovery duct, positioned alongside each other, the supply duct tapering in cross-section from a maximum to a minimum, the recovery duct tapering in cross-section from a minimum to a maximum, and means positioned at or adjacent to a transitional position at which the recovery duct is at its maximum cross-section for reenergising the fluid recovered into the recovery duct and feeding the fluid into a supply duct where that supply duct is at its maximum cross-section.

For convenience the gas forming the cushion and the fluid forming the curtain or curtains is hereinafter referred to as air, although it will be appreciated that engine exhaust gases and other fluids and gases can be used.

Figure 7:
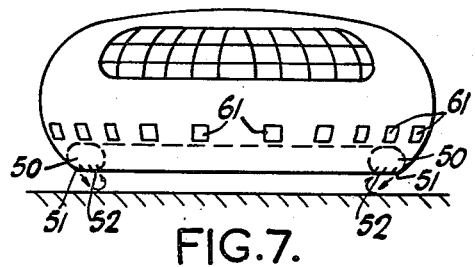
Figure 8:
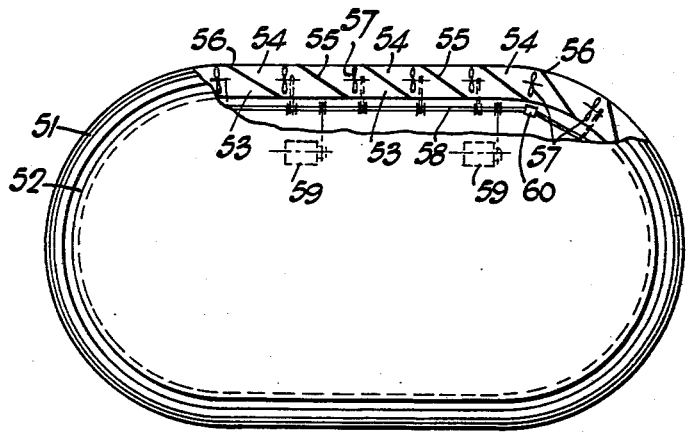

The invention will be readily understood by the following descriptions of certain embodiments in conjunction with the accompanying drawings in which:

FIGURE 1 is a diagrammatic horizontal cross-section through the bottom portion of a vehicle illustrating a simple duct arrangement, FIGURE 2 is a cross-section on the line A—A of FIGURE 1, FIGURE 3 is a diagrammatic horizontal cross-section through the bottom portion of a vehicle illustrating an alternative duct arrangement, FIGURE 4 is a cross-section on the line B—B of FIGURE 3, FIGURE 5 is a cross-section similar to that of FIGURES 2 and 4, illustrating an arrangement where multiple curtains are formed, FIGURE 6 is a side elevation of a vehicle embodying the invention, FIGURE 7 is a front view of the vehicle illustrated in FIGURE 6, and FIGURE 8 is an inverted plan view of the vehicle illustrated in FIGURES 6 and 7 with part of the bottom surface removed to show the duct formation.

In FIGURE 1, two ducts 1 and 2 are formed around the periphery of the vehicle. The two ducts 1 and 2 are each divided by separating members 15 and 16 to form supply sections 3 and 4, and recovery sections 5 and 6, respectively. Two compressors 7 and 8 are positioned at transition points 9 and 10 where each recovery section is at a maximum cross sectional area.

It will be seen that when recovery section 5 associated with compressor 7 is at its maximum cross-sectional area at the transition position 9, the supply section 3 associated with compressor 8 is at its minimum cross sectional area. At the same transitional position 9 the supply section 4 is at its maximum cross sectional area while recovery section 6 is at its minimum cross sectional area. A typical cross section, taken on the line A—A of FIGURE 1 is shown in FIGURE 2. As the air passes from the compressor 7 it flows through the supply section 4 of duct 2 and passes out of a section of an annular supply port 11 in the bottom of the vehicle to form a curtain. The air initially flows downwards and inwards towards the surface. A pressurised cushion is built up beneath the vehicle in the space 12. The air flowing from the supply port downwards and inwards is then caused by the pressure of the air cushion in the space 12 to flow upwards and outwards into a section of an annular recovery port 13, also formed in the bottom of the vehicle and displaced inwards and substantially parallel to the supply port 11, and into recovery section 6 of the duct 2. Thus as the air flowing along the supply section 4 issues to form the air curtain, the mass of air in the section is decreasing and the cross sectional area is reduced. Similarly as air is fed back to the recovery section 6, the mass increases and the cross sectional area is increased. These variations in areas are readily achieved by varying the position of the separating member 16.

The air in the recovery section 6 passes to the air compressor 8 and thence into the supply section 3 of duct 1 where it issues from a further section of the supply port 11. This air is recovered as before, through a further section of the recovery port 13 into the recovery section 5 of duct 1.

A similar variation in cross sectional areas of the sections 3 and 5 is obtained by separating member 15.

When operation of the vehicle is started, there is no cushion of pressurised air contained in the space 12 beneath the vehicle. This is formed by the air issuing from the supply port 11 flowing into this space at starting. There is therefore no flow of air into the recovery port 13, and auxiliary air inlets 18, which can be operated to open the recovery sections at atmosphere, are provided for the supply of air to the compressors when starting. As pressure builds up beneath the vehicle, the air curtain gradually attains the form as shown in FIGURE 2 and described above, the pressure of the air cushion deflecting the air curtain until it enters the recovery port 13. By this time the air cushion pressure will be such that it is supporting or assisting in supporting the vehicle clear of the surface. Normally, some air will be lost from the air curtain system. Fresh air will thus need to be supplied to the air curtain and this can readily be done through the auxiliary air inlets 18. The amount of fresh air is considerably less than is required at starting, and once the air curtain has been formed the auxiliary air inlet 18 is partly closed.

A further form of vehicle is illustrated in FIGURE 3. In this vehicle air from a compressor 21 passes through a duct 22 passing along the centre of the vehicle. At the front of the vehicle the duct 22 divides into two ducts 23 and 24, one passing along one side of the vehicle and the other passing along the other side. These ducts, as before, are divided into supply sections 25 and 26 and recovery sections 27 and 28 by separating members 32. A typical cross section of a duct is as shown in FIGURE 4 which is taken on the line B—B of FIGURE 3. Air from the supply duct 22 is fed to the supply sections 25 and 26 where it issues from a supply port 30 formed in the bottom of the vehicle adjacent to the periphery to form an air curtain. As in the previous example, the air flowing from the supply port 30 flows downwards and inwards to the surface and then upwards into a recovery port 31, passing into the recovery sections 27 and 28. The cross sectional areas of the sections are varied, as before, by the separating members 32 the position of which varies around the ducts. An auxiliary air inlet flap 33 is provided for the supply of air to the compressor.

The arrangement shown in FIGURE 3 is particularly suitable when it is intended to expel the air through the supply port to form a curtain with a rearward component of direction for propulsion purposes as the air flows in the duct along both sides of the vehicle in the same direction, this direction being arranged to be the direction of movement of the vehicle. Also, with the air flow in the same direction along both sides of the vehicle, no turning moment is created by the air issuing from the ports to form the curtain.

The duct arrangements described above can be repeated one or more times to form concentric curtain systems, either for the whole or part of the periphery of the vehicle. A vertical cross section of such a system is shown in FIGURE 5. Two ducts 35 and 36 are positioned side by side, the ducts being divided into supply sections 37 and 38 and recovery sections 39 and 40 by separating members 41 and 42, respectively. An inner air curtain 43 is formed by air flowing from supply section 37 through a supply port 44. The air flowing from the supply port 44 flows initially downwards and inwards towards the surface and is then deflected by the cushion pressure round and upwards into a recovery port 45 and thence into the recovery section 39. An outer air curtain 46 is similarly formed by air flowing from the supply section 38 through supply port 47, the air issuing initially inwards and downwards towards the surface and being then deflected round and upwards to a recovery port 48 by the pressure of a secondary air cushion which forms in the space 49 between the two air curtains. From the recovery port 48 the air flows into the recovery section 40.

FIGURES 6, 7 and 8 illustrate a larger vehicle than those previously described above. A duct 50 is positioned round the periphery of the bottom of the vehicle, and an annular supply port 51 and an annular recovery port 52 are formed in the bottom of the duct. The supply port 51 is adjacent to the periphery of the bottom of the vehicle and the recovery port 52 is spaced parallel to and inboard of the supply port. The duct 50 is divided into a series of supply sections 54 and a series of recovery sections 53 by a plurality of separating members 55. At the transitional positions 56 compressors 57 are provided. The compressors, in the present example, are driven from a shaft 58 which is itself driven by engines 59. Suitable flexible couplings 60 are provided where the shaft traverses a curved part of the vehicle periphery. A series of auxiliary air inlets 61 are provided for the supply of additional air to the compressors as described above. Although a comparatively large number of supply sections and recovery sections with their co-operating compressors are provided around the periphery of the vehicle, the operation of forming the air curtains is substantially as described above in respect to FIGURES 1 and 2.

The auxiliary air inlet flaps 18, 33 and 61 of FIGURES 1, 3, 6 and 7 respectively, can be opened to any other suitable source of air, instead of to atmosphere, and this other source may be at a pressure above atmosphere, but below the normal cushion pressure. Where multiple systems, such as that shown in FIGURE 5, are provided both flaps may be opened to the same pressure supply. For more efficient operation, however, it is advisable for the auxiliary air supply for the inner curtain system, in most cases, to be at a higher pressure than the auxiliary air for the outer curtain system.

We claim:

1. A vehicle for travelling over a surface which, in operation, is at least partly supported above that surface by a cushion of pressurised gas formed beneath the vehicle, the cushion being contained for at least part of its periphery by a curtain of fluid issuing from at least one supply port formed in the bottom of the vehicle and adjacent to the periphery thereof, at least part of the fluid forming the curtain being recovered through at least one recovery port formed in the bottom of the vehicle parallel to and inboard of the supply port, including a duct system for supplying fluid to and recovering fluid from the supply and recovery ports comprising at least one supply duct and at least one co-operating recovery duct, positioned alongside each other and each tapering in cross-section, the supply duct tapering in cross-section from a maximum to a minimum in the same direction as that in which the recovery duct tapers in cross-section from a minimum to a maximum and means positioned adjacent to a transitional position at which the recovery duct is at its maximum cross-section for reenergising the fluid recovered into the recovery duct and feeding the fluid into a supply duct where that supply duct is at its maximum cross-section.

2. A vehicle as claimed in claim 1 wherein the supply duct and recovery duct are sections of a single duct divided longitudinally into a supply section and a recovery section by a member, the position of the member being varied from one end of the duct to the other.

3. A vehicle as claimed in claim 2 in which the member is a vertical diaphragm extending along said single duct.

4. A vehicle for travelling over a surface which, in operation, is at least partly supported above that surface by a cushion of pressurised gas formed beneath the vehicle, the cushion being contained for at least part of its periphery by a curtain of fluid issuing from at least one supply port formed in the bottom of the vehicle and adjacent to the periphery thereof, at least part of the fluid forming the curtain being recovered through at least one recovery port formed in the bottom of the vehicle parallel to and inboard of the supply port, including a duct system for supplying fluid to and recovering fluid from the supply and recovery ports comprising a plurality of pairs of supply and co-operating recovery ducts extending around the periphery of the vehicle, the supply and recovery ducts of each pair being positioned alongside one another and each tapering in cross-section, the supply duct of each pair tapering in cross-section from a maximum to a minimum in the same direction as that in which the co-operating recovery duct tapers in cross-section from a minimum to a maximum, and means positioned adjacent the maximum cross-sectional area end of the recovery duct of each pair for reenergising the fluid recovered into said duct and for feeding said fluid into the maximum cross-sectional area end of the supply duct of another pair.

5. A vehicle as claimed in claim 4 wherein the maximum cross-sectional end of the supply duct of each pair communicates directly with the maximum cross-sectional end of the recovery duct of another pair.

6. A vehicle as claimed in claim 4 wherein said fluid reenergising and feeding means is a compressor which delivers fluid into the maximum cross-sectional end of each supply duct, and including means for admitting auxiliary fluid to the suction side of said compressor.

7. A vehicle for travelling over a surface which, in operation, is at least partly supported above that surface by a cushion of pressurised gas formed beneath the vehicle, the cushion being contained for at least part of its periphery by a curtain of fluid issuing from at least one supply port formed in the bottom of the vehicle and adjacent to the periphery thereof, at least part of the fluid forming the curtain being recovered through at least one recovery port formed in the bottom of the vehicle parallel to and inboard of the supply port, including a duct system for supplying fluid to and recovering fluid from the supply and recovery ports comprising two pairs of supply and co-operating recovery ducts extending from the front to the rear of the vehicle in opposite directions around the periphery thereof, the supply and recovery ducts of each pair being positioned alongside one another and each tapering in cross-section, the supply duct of each pair tapering in cross-section from a maximum to a minimum in the same direction as that in which the co-operating recovery duct tapers in cross-section from a minimum to a maximum, the maximum cross-sectional area ends of both supply ducts being positioned at the front of the vehicle, another duct extending from the front to the rear of the vehicle inboard of said supply and recovery ducts and communicating at its front end with the maximum cross-sectional area ends of both supply ducts and at its rear end with the maximum cross-sectional area ends of both recovery ducts, and a compressor positioned in said other duct for reenergising the fluid recovered into said recovery ducts and for feeding said fluid into said supply ducts.

8. A vehicle as claimed in claim 7, including means for admitting auxiliary fluid into said other duct on the suction side of said compressor.

9. A vehicle for travelling over a surface which, in operation, is at least partly supported above that surface by a cushion of pressurised gas formed beneath the vehicle, the cushion being contained for at least part of its periphery by inner and outer curtains of fluid issuing from inner and outer supply ports formed in the bottom of the vehicle and adjacent to the periphery thereof, at least part of the fluid forming each curtain being recovered through a recovery port formed in the bottom of the vehicle parallel to and inboard of the associated supply port, including a duct system for supplying fluid to and recovering fluid from the supply and recovery ports comprising a pair of ducts positioned side by side, a vertical diaphragm in each of said ducts dividing the interior thereof into a supply section and a recovery section, the position of each of said diaphragms varying from one end of the duct to the other so that the supply section of each duct tapers in cross-section from a maximum to a minimum in the same direction as that in which the co-operating recovery section tapers in cross-section from a minimum to a maximum, and means for reenergising the fluid recovered into each of said recovery sections and for feeding said fluid into a supply section.

10. A vehicle for travelling over a surface which, in operation, is at least partly supported above that surface by a cushion of pressurised gas formed beneath the vehicle, the cushion being contained for at least part of its periphery by a curtain of fluid issuing from at least one supply port formed in the bottom of the vehicle and adjacent to the periphery thereof, at least part of the fluid forming the curtain being recovered through at least one recovery port formed in the bottom of the vehicle parallel to and inboard of the supply port, including a duct system for supplying fluid to and recovering fluid from the supply and recovery ports comprising a plurality of ducts arranged in series, each of said ducts being divided longitudinally into a supply section and a recovery section by a member, the position of said member being varied from one end of each duct to the other so that the co-operating supply and recovery sections of the duct taper in cross-section, each supply section tapering in cross-section from a maximum to a minimum in the same direction as that in which the co-operating recovery section tapers in cross-section from a minimum to a maximum, the fluid issuing from each of said supply sections being recovered into the co-operating recovery section, and means for reenergising the fluid recovered into each of said recovery sections and for feeding said fluid into the supply section of the next adjacent duct in the series.

References Cited in the file of this patent

UNITED STATES PATENTS 2,838,257    Wibault _____ June 10, 1958

OTHER REFERENCES

Publication: "Symposium On Ground Effect Phenomena," presented at Princeton University, October 21–22, 1959; pages 111–118.